United States Patent [19]
Rundqvist

[11] 3,827,567
[45] Aug. 6, 1974

[54] APPARATUS FOR TREATING MATERIAL SUSPENDED IN WATER

[75] Inventor: Lars-Goran Rundqvist, Tumba, Sweden

[73] Assignee: AB Celleco, Tumba, Sweden

[22] Filed: Mar. 21, 1973

[21] Appl. No.: 343,234

[30] Foreign Application Priority Data
Mar. 29, 1972   Sweden.............................. 4066/72

[52] U.S. Cl.................. 210/414, 209/250, 209/273, 209/389
[51] Int. Cl........................................... B01d 35/16
[58] Field of Search ........... 210/359, 414, 415, 413; 209/250, 358, 359, 389, 390, 273

[56] References Cited
UNITED STATES PATENTS
| | | | |
|---|---|---|---|
| 2,901,763 | 9/1959 | Jalkanen | 210/415 |
| 3,159,572 | 12/1964 | Ranhagen | 210/414 |
| 3,545,621 | 12/1970 | Lamont | 210/414 |

*Primary Examiner*—Charles N. Hart
*Assistant Examiner*—F. F. Calvetti
*Attorney, Agent, or Firm*—Cyrus S. Hapgood

[57] ABSTRACT

The apparatus comprises means for spraying a suspension upon one side of a strainer, and a device which at least in successive increments covers the other side of the strainer, thereby preventing clogging of the strainer.

5 Claims, 4 Drawing Figures

PATENTED AUG 6 1974　　　　　　　　　　　　　　3,827,567

APPARATUS FOR TREATING MATERIAL SUSPENDED IN WATER

The present invention relates to apparatus for classification, dewatering, etc., of material suspended in water, said apparatus comprising a strainer together with means for spraying the water suspension onto the strainer. The arrangement is primarily characterized by means arranged periodically to cover, with a surface, the side of the strainer that is opposite to the side on which the suspension is sprayed, or successively to cover parts of said opposite side.

In a preferred embodiment of the invention, the means for spraying the suspension onto the strainer are arranged to spray onto only a part of the surface of the strainer, preferably a central part of a circular strainer.

It is known to effect the classification, dewatering, etc., of a material suspended in water by providing apparatus having a spray nozzle arranged to spray the suspension in the form of a widening jet upon a strainer generally consisting of a fine-mesh fabric. In such apparatus, the major portion of the water of the suspension, together with suspended fine particles, passes through the strainer, whereas coarser suspended particles form a layer on the side of the strainer facing the spray nozzle and are thus separated from the suspension.

Provided that the quantity of suspended material thus supplied to the strainer per unit of time is suitably proportioned, the layer of the coarser material forming on the strainer will continuously be washed away over the edge of the strainer during the continuous spraying of the suspension onto the strainer. However, if the strainer is loaded with too large a quantity of suspended material per unit of time, the jet of suspension being sprayed cannot wash away the layer formed on the strainer at the same rate as it is being formed, and it will then take only a short time until the strainer is completely obstructed and the operation of the apparatus must be discontinued.

There is one known embodiment of this classification or dewatering apparatus in which a lower air pressure is maintained on the non-sprayed side of the strainer (i.e., the side opposite to the side where the spray nozzle is arranged) than the air pressure that is prevailing on the other side of the strainer. It has been proved that the production capacity of the apparatus can thus be increased. In that case it is necessary, however, that the quantity of the suspended material being sprayed per unit of time be proportioned correctly, in order to maintain a continuous operation of the apparatus. In that case, it is also important to balance correctly the difference between the air pressures on opposite sides of the strainer. If the pressure difference is too great, the strainer will be obstructed after only a short time.

Surprisingly, it has now been proved that by periodically covering the side of the strainer opposite to the side which is hit by the jet of suspension being sprayed, the strainer is not obstructed if the load on it is increased. Thus, it is even possible to increase considerably the difference between the air pressures on opposite sides of the strainer without its being obstructed. These circumstances mean that it is possible, by applying the present invention, to increase considerably the production capacity of a classification or dewatering installation of a certain size.

The apparatus for classification and dewatering according to the invention can be provided either with a device having a surface which completely and periodically covers the side of the strainer that is opposite to the side on which the jet of suspension is sprayed, or with a device having a surface for covering parts of said opposite side successively.

The reason why it is possible to increase considerably the production capacity of a plant of a certain size, which is provided with the arrangement according to the invention, is that the jet sprayed onto the strainer, when the sprayed side of it is covered, can wash away a considerably thicker layer of separated coarser material from the sprayed surface than has so far been possible in installations without the arrangement according to the invention. The strainer can therefore be subjected to a spray with a considerably higher quantity of suspended material per unit of time, and also the difference between the pressures on opposite sides of the strainer can be increased without the strainer being obstructed.

In a preferred embodiment of the present invention, only a part of the surface of the strainer is subjected to the spray of the suspension, preferably a central part of a circular strainer. This means that on a zone of the strainer that is not hit by the jet being sprayed, there will be formed a particularly thick layer of coarser separated material. Because this layer will be dewatered to a considerable degree before it is washed away by the jet of suspension, when the other side of the strainer is covered by means of the device according to the invention, the concentration of the separated coarser phase of the suspension thus separated will be considerably higher than the concentration that could previously be obtained in installations of this kind.

The invention will be described more in detail below with reference to the accompanying drawing, in which.

Figure 1:
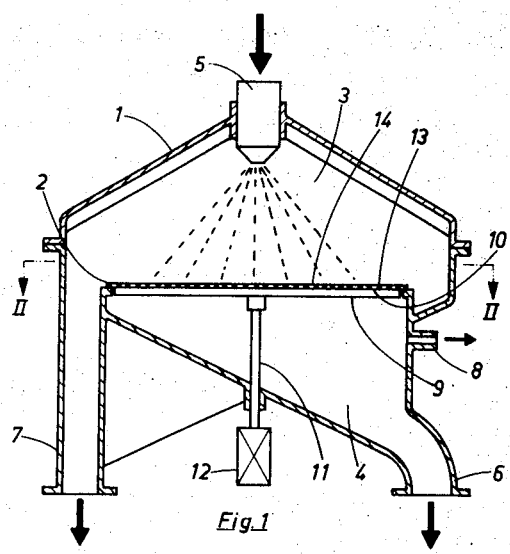
FIG. 1 shows a vertical section of a schematically represented apparatus for the fractionation of a cellulose suspension in connection with the making of paper.

In the drawing, the housing of the fractionation apparatus is indicated by reference numeral 1. There is a strainer 2 arranged in the housing and which divides the same into two chambers 3 and 4. The cellulose suspension that is to be fractionated or classified is sprayed on the upper side of the strainer 2 by means of a spray nozzle 5 which forms a full conical jet. Short cellulose fibers, pigments and similar small particles in the suspension will then pass through the strainer 2 together with the major part of the water content in the suspension, and are collected in chamber 4 and led away via tube connection 6. The long cellulose fibres which do not pass through the strainer will immediately form a layer on the surface of the strainer, but it will continuously be washed away over the edges of the strainer by the sprayed suspension, and it is led away via tube connection 7 from chamber 3.

The circular strainer 2 is given such a size, in comparison to the diameter of the jet formed by the spray nozzle 5, that an outer annular zone 13 is formed which is not hit by the jet. The central zone hit by the jet is designated 14 in the drawing. Chamber 4 is connected by means of connection 8 to a vacuum system, and thus a lower air pressure will prevail in chamber 4 than in chamber 3.

With an increased load on the strainer 2 of the fractionation apparatus, and a considerably reduced pressure in chamber 4, the zone 13 will after a short time of operation be covered with a comparatively thick layer of cellulose fibres which could normally not be removed from the strainer without a discontinuation of the operation, as the sprayed-on jet would not have been able to detach the layer. However, the apparatus according to the invention is provided with a device 9 having a surface 10 arranged to cover the lower side of the strainer periodically. When the underside of the strainer is thus covered, the sprayed-on jet acquires a power of clearing the strainer and thus washing away even the comparatively thick fibre layer on the zone 13, which could not previously be accomplished. The reason for this is presumably that a part of the suspension which passes through the strainer will be reflected by the surface 10 and act upon the strainer from below, thereby lifting off the layer. Before the layer of fibres formed on strainer zone 14 is washed from the strainer, this layer is comparatively well dewatered, and the fraction of long cellulose fibres discharged through the tube connection 7 will therefore have a considerably higher concentration than it previously had in installations of this kind.

Figure 2:
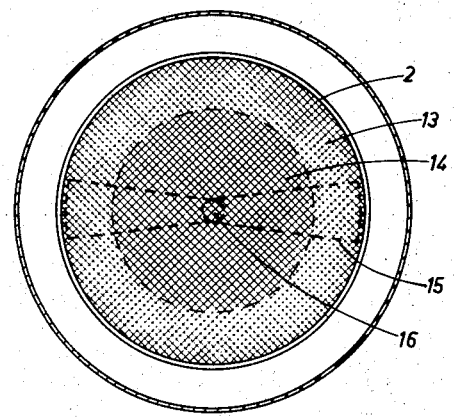
FIG. 2 shows a horizontal section on line II—II of the apparatus shown in FIG. 1.
Figure 3:
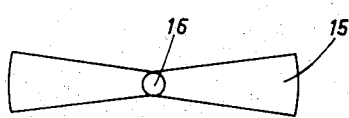

The device 9 comprises a plate with a surface 10 arranged to cover the underside of the strainer 2 periodically by being raised and lowered by means of a vertical rod 11 connected to a piston in the pneumatic cylinder 12. Instead of the device 9 being in the form of a plate that will cover the complete underside of the strainer, this device may consist of means provided with a surface for covering only a fraction of the surface of the strainer. Such a device is shown in FIG. 3. It has two wings 15 and is supported by a spindle 16 corresponding to the rod 11 in FIG. 1. The device with the wings 15, together with the spindle 16, is arranged to be rotated by a motor corresponding to the pneumatic cylinder 12. During the rotational movement, the wings 15 will successively cover parts of the underside of the strainer, whereby the fibre layer formed on the zone 13 will be continuously removed. The device with the wings 15 can be seen under the strainer in FIG. 2.

Figure 4:
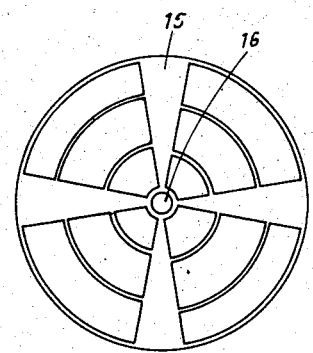
FIGS. 3 and 4 show two different embodiments of a means forming part of the arrangement.

The modified device according to FIG. 4 is provided with four wings 15. Because the device is provided with four wings, it can even with a very slow rotation movement aid in continuously clearing zone 13 and be rotated by means of a simple driving arrangement, such as a pneumatic ratchet device.

I claim:

1. In an apparatus for treating material suspended in water, as by classifying and/or dewatering such material, the combination of a strainer, means for spraying said suspension upon one side of the strainer, and a spray-reflecting device operable to present a surface which at least in successive increments covers the other side of the strainer in surface-to-surface contact therewith.

2. The combination of claim 1, in which said surface has an area sufficient to cover simultaneously the entire said other side of the strainer.

3. The combination of claim 1, in which said surface has an area insufficient to cover simultaneously the entire said other side of the strainer, said device including means for rotating said surface to cover the entire said other side in increments.

4. The combination of claim 1, in which said spraying means are operable to spray only part of said one side of the strainer.

5. The combination of claim 4, in which said part is the central part of said one side.

* * * * *